(No Model.)
J. S. WATERMAN.
Corn Sheller.
No. 233,649. Patented Oct. 26, 1880.
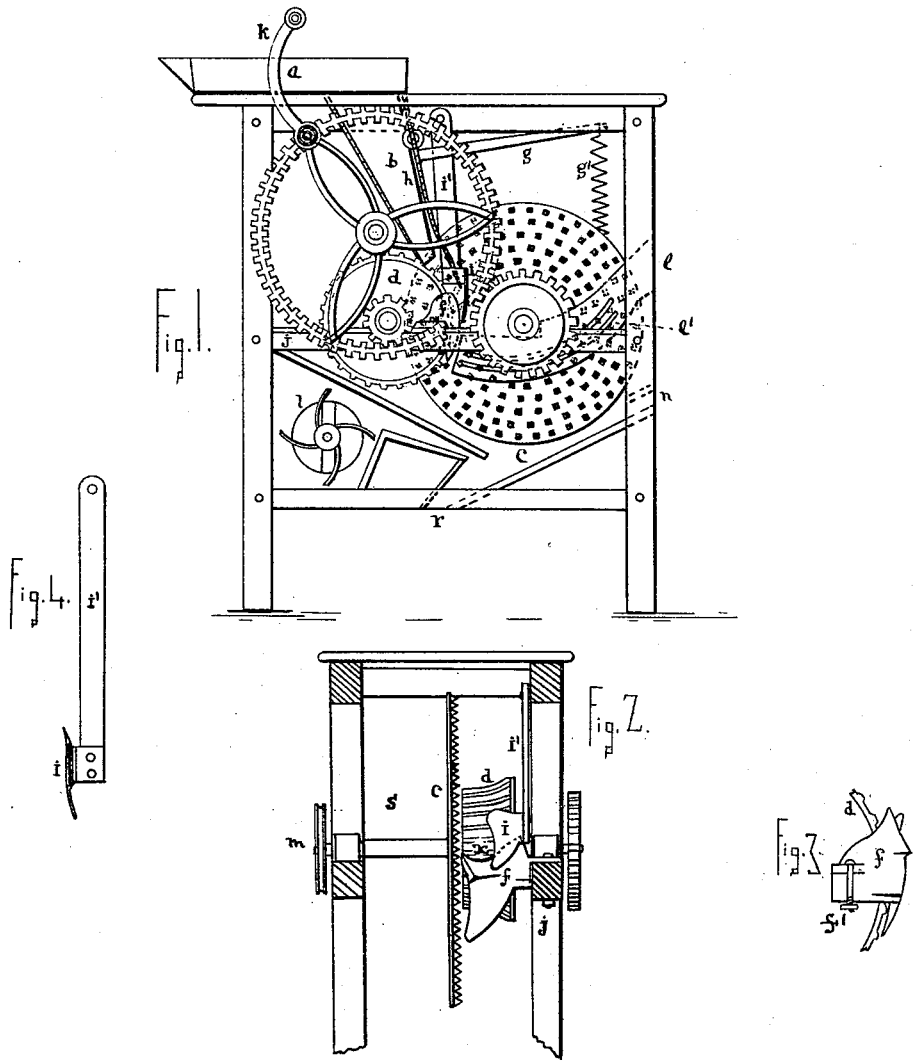

UNITED STATES PATENT OFFICE.

JOHN S. WATERMAN, OF ITHACA, NEW YORK.

CORN-SHELLER.

SPECIFICATION forming part of Letters Patent No. 233,649, dated October 26, 1880.

Application filed June 30, 1880. (No model.)

*To all whom it may concern:*

Be it known that I, JOHN SAYLES WATERMAN, of Ithaca, Tompkins county, New York, have invented certain Improvements in Machines used for Shelling Corn, whereof the following is a specification.

My invention relates to but a small point in the well-known and commonly-used machine made of a large rag or scratch wheel with a smaller shelling-wheel revolving by its side, the shafts of which lie parallel, and the said wheels are driven by gearing in opposite directions, so that the ears of corn fed to the machine lie in the shallow groove formed by these two wheels, and are rotated and shelled, a part of the feed-spout being hinged and held by a spring against the ear during the revolution of the ear and its progress forward over the wheels.

My invention consists of one or more plates of metal in close approximation to the said wheels and the ears of corn while being shelled, and is for the purpose of preventing the shelled corn from passing with the cobs out of the cob-exit, thus effecting a more perfect separation of the cobs and shelled corn; and these plates of metal also guide the cobs onward in a more perfect manner.

Figure 1 is a side elevation of my machine, with the boxing-boards removed. Fig. 2 is an enlarged end view of my machine, showing the rag or scratch wheel, the shelling-wheel, and my plates, other parts being omitted. Fig. 3 is a detached outside view of my plate $f$ and a part of the shelling-wheel. Fig. 4 is a detached view of rag-plate $i$ and its hinging-rod.

In the figures, $a$ is the hopper that receives the corn to be shelled, whence the spout $b$ takes it down to the rag-wheel $c$ and shelling-wheel $d$. The main use of the rag or scratch wheel is to hold the ear of corn while being shelled against the shelling-wheel, and to revolve the ear while thus held, and to expel from the machine the cobs.

The shelling-wheel $d$ has long ridge-like teeth, which are the main means of tearing the corn off of the cobs, and as it does so the loosened corn is scattered in various directions quite violently when the machine is run at high speed; and to prevent its being thrown upon and along with the cobs and out at the cob-exit $e$, I place a main plate, $f$, just before, where the most of the shelling is done, as shown, and it retains the corn and drops it downward, separating the corn from the cobs, which pass on through the tubular guide $e'$, which conveys them on through the tubular cast piece or cob-conveyer $e''$, which conducts them out of the exit $e$. It curves upward in front of the scratch-wheel, as shown in Fig. 1.

As the corn falls a fan, $l$, clears it of chaff, when it goes out by the exit $r$. An auxiliary plate, $i$, is placed above and partially over the plate $f$. It is fast to the rod or arm $i'$, which rod is hinged to the frame of the machine. This hinging of the plate $i$ is to allow it to move away from the wheel $d$ when large ears are being shelled, both by the action of the pressure-plate $h$ of the spout, and also by the cob itself, thus accommodating the cob-space $x$, Fig. 2, to the cob.

The parts in Fig. 1 are small, but the hinging flat rod $i'$ is easily seen, and at its base is the edge of the plate $i$, and just to its left is the plate $f$, shaped somewhat like the wing of a bird, partially raised. This plate covers part of the shelling-wheel $d$ and fits closely to the wheel $c$, and is held fast, by bolts $f''$, to the cross-bar $j$ of the machine-frame. I have already said the plate $i$ is movable, as it is hinged.

In this specification special attention is called to plates $f$ and $i$, and to understand the machine it will be noticed that the right-hand wall, $h$, Fig. 1, of the spout $b$ is hinged, and has a spring-arm, $g$, and spring $g'$. The plate $i$ rests on the lower end of this right-hand (Fig. 1) spout-wall, and moves with it as it gives to the various-sized ears of corn.

The machine is driven by a belt-pulley, or, in hand-machines, by the crank $k$, the action of the gearing-cogs being apparent in Fig. 1, and is arranged for a high speed of the scratch-wheel and a greater speed still for the shelling-wheel. Slots are in the tube $e'$ to let the corn out that escapes the plates $f$ and $i$. The fan $l$ is driven by a round belt in grooved wheels, one of which is seen in Fig. 2 at $m$, which fan expels through the exit $n$ the chaff.

In Fig. 2 the wheels and plates are seen on the right-hand side of the machine. In double machines the wheels, plates, and other parts are duplicated in the blank space s on the left-hand of the machine.

In Fig. 3 one side of the plate f and the bolt f', by which it is held to the frame, is seen, the plate covering the outer end of and extending over the face of the shelling-wheel d, whose concave face is thus covered by that part of the plate that curves around the wheel until it is at an angle less than a right angle to that side shown in Fig. 3.

Fig. 4 has the plate i at its base, rod i' with hinging-aperture at its top. The advantages and uses are apparent.

What I claim is—

1. The fixed plate f, covering and fitting the wheel d, and fitted to the face of the wheel c, in combination with the said wheels, substantially as set forth.

2. The movable plate i, fast to the hinging-rod i', and closing the space just over the plate f, and moved by the spout-plate h, as shown and described.

3. The plates f and i, wheels c and d, feed-spout b, movable spout-plate h, and tubular cob-conveyer e', combined and operating together as set forth.

JOHN SAYLES WATERMAN.

Witnesses:
S. F. MACK,
L. L. TREMAN.